US006917336B2

(12) United States Patent
Rowser et al.

(10) Patent No.: US 6,917,336 B2
(45) Date of Patent: Jul. 12, 2005

(54) MINIATURE ULTRA-WIDEBAND ACTIVE RECEIVING ANTENNA

(75) Inventors: Andrew Rowser, Issaquah, WA (US); Christopher David Long, Maple Valley, WA (US); Glenn Borland, Escondido, CA (US)

(73) Assignee: Dotcast, Inc., Kent, WA (US)

( * ) Notice: Subject to any disclaimer, the term of this patent is extended or adjusted under 35 U.S.C. 154(b) by 108 days.

(21) Appl. No.: 10/269,200

(22) Filed: Oct. 3, 2002

(65) Prior Publication Data

US 2003/0227572 A1 Dec. 11, 2003

Related U.S. Application Data

(60) Provisional application No. 60/351,476, filed on Jan. 23, 2002.

(51) Int. Cl.[7] ................................................. H01Q 1/26
(52) U.S. Cl. ....................... 343/701; 343/793; 455/291; 455/269; 330/311
(58) Field of Search ................................. 343/701, 859, 343/850, 853, 793; 455/291, 269, 280, 292, 272; 330/311, 310, 250; 327/100, 102

(56) References Cited

U.S. PATENT DOCUMENTS

| | | | |
|---|---|---|---|
| 2,977,551 A | 3/1961 | Gibson et al. | 332/164 |
| 3,386,033 A | 5/1968 | Copeland et al. | 455/291 |
| 3,703,685 A | 11/1972 | Simopoulos et al. | 343/701 |
| 3,714,659 A | 1/1973 | Firman | 343/701 |
| 3,774,218 A | 11/1973 | Fowler | 343/701 |
| 3,827,053 A * | 7/1974 | Willie et al. | 343/701 |
| 4,001,696 A * | 1/1977 | Bannerman | 455/291 |
| 4,115,778 A | 9/1978 | Snow | 343/701 |
| 4,459,595 A | 7/1984 | Kramer et al. | 343/701 |
| 4,587,495 A | 5/1986 | Osawa et al. | 330/311 |
| 4,602,260 A | 7/1986 | Lindenmeier et al. | 343/311 |
| 4,754,233 A | 6/1988 | Pickett | 330/311 |
| 4,903,034 A * | 2/1990 | Kropielnicki et al. | 455/291 |
| 5,019,830 A | 5/1991 | Harada | 343/701 |
| 5,032,799 A * | 7/1991 | Milberger et al. | 330/311 |

(Continued)

FOREIGN PATENT DOCUMENTS

| | | |
|---|---|---|
| WO | WO 94/23470 A1 | 10/1994 |
| WO | WO 95/01676 A1 | 1/1995 |
| WO | WO 00/72446 A1 | 11/2000 |

OTHER PUBLICATIONS

Ormiston, T. D., et al., "Compact Low Noise Receiving Antenna," *IEE Electronics Letters*, Jul. 9, 1998, vol. 34, No. 14, pp. 1367–1368.

(Continued)

*Primary Examiner*—Shih-Chao Chen
*Assistant Examiner*—Ephrem Alemu
(74) *Attorney, Agent, or Firm*—Perkins Coie LLP (57) ABSTRACT

According to some aspects of this invention, a compact, broadband active receiving antenna uses one or more high transconductance transistors such as Field Effect Transistor(s) paired with another Transistor and arranged in a Cascode amplifier configuration. Some embodiments involve a single high transconductance transistor arranged with a high efficiency transformer in a nondissipative feedback loop to improve linearity and dynamic range. The devices have a high input resistance, low input capacitance, low noise and a very high second and third order Intercept Point. Since the gain is primarily a function of the amplifying electronics, it is not necessary to increase the directivity of the antenna to achieve higher gain.

30 Claims, 7 Drawing Sheets

U.S. PATENT DOCUMENTS

| | | | | |
|---|---|---|---|---|
| 5,138,330 A | | 8/1992 | Lindenmeier et al. | 343/713 |
| 5,172,126 A | | 12/1992 | Naito | 343/701 |
| 5,714,965 A | | 2/1998 | Taguchi | 343/866 |
| 5,742,902 A | | 4/1998 | Shore | 455/336 |
| 5,994,891 A | | 11/1999 | Hubbell | 324/96 |
| 6,044,255 A | * | 3/2000 | Suematsu et al. | 455/333 |
| 6,066,993 A | | 5/2000 | Yamamoto et al. | 333/103 |
| 6,268,774 B1 | | 7/2001 | Soumyanath | 333/305 |
| 6,320,548 B1 | | 11/2001 | Harrell et al. | 343/700 MS |
| 6,744,322 B1 | * | 6/2004 | Ma et al. | 330/311 |

OTHER PUBLICATIONS

Covington, M. A., "AM/FM/SW Active Antenna," *Popular Electronics*, Jul. 1989, vol. 6, No. 7, pp. 73 and 106.

Tooley, M., et al., "Active Receiving Antenna," *Practical Wireless*, Mar. 1981, vol. 57, No. 3, pp. 52–56.

Nordholt, E. H., et al., "A New Approach to Active Antenna Design," *IEEE Transactions on Antennas and Propagation*, Nov. 1980, vol. AP–28, No. 6, pp. 904–910.

* cited by examiner

MINIATURE ULTRA-WIDEBAND ACTIVE RECEIVING ANTENNA

RELATED APPLICATION

This document relies on the priority of U.S. Ser. No. 60/351,476 filed Jan. 23, 2002 and entitled "Miniature Ultra-Wideband Active Receiving Antenna" which is incorporated herein by this reference.

BACKGROUND

This invention relates to radio frequency antennas, including various compact high performance active antennas designed to receive a broad spectrum of television, radio, or other like signals.

The field of radio frequency receiving antennas for indoor applications is extensive and well understood within the constraints of traditional antenna designs. Passive antennas require that the receiving element bear some geometric relationship to the wavelength and propagation properties of the signal being received. They therefore need to be adjusted or otherwise modified when changing wavelengths. Similarly, traditional active receiving antennas rely on a good impedance match in order to efficiently couple received power to the receiver. Unfortunately, this requirement also constrains the range of frequencies that can be efficiently received. Furthermore, active antennas and their associated electronics tend to be fairly large and somewhat costly and need to be manually adjusted on a channel-by-channel basis.

This invention is particularly relevant to, among other fields, the emerging field of datacasting in which digital data (which may represent files containing movies, music, software, video games, or other digitally encoded content) is attached to or inserted in a television or radio station's broadcast signal. A receiver in the home or business then tunes in the subject signal and extracts the digital data needed to recreate the content being distributed. These files could be, by way of example, MP-3 music files, or MPEG video files. To be truly suitable for such an application, certain embodiments according to the present invention contemplate a datacasting receiver that should be relatively inexpensive, able to automatically tune to the particular station over which the data is being broadcast, acquire relatively weak television signals with no manual intervention, and remain insensitive to the physical orientation of the receiver. Various embodiments of the invention can be useful in any context where improved radiofrequency wave reception is desired.

Compact and highly sensitive active receiving antennas according to various embodiments of this invention can receive a wide range of broadcast television and other frequencies. Certain embodiments of the invention provide an antenna with a compact form-factor that can be concealed in any one of a number of end user datacasting or other reception devices, both fixed and mobile. Furthermore, various embodiments of the invention can be reasonably omni directional to minimize device orientation issues. They may also be highly sensitive across a wide spectrum of TV signals and can provide effective indoor reception of TV signals at what would normally be the edge of the so-called "B-contour" of the transmitter tower. That contour refers to the geographical area served by a given transmitter in which the received television signal is viewable without excessive noise and static. Previous efforts in the area of traditional indoor TV antenna designs and active receiving antennas have not met these goals in a single solution.

An embodiment of the invention that is disclosed herein incorporates a "cascade" amplifier. Cascade amplifiers have occasionally been used as part of stand-alone radio frequency amplifier applications such as disclosed by Picket (U.S. Pat. No. 4,754,233) or Osawa, et al (U.S. Pat. No. 4,587,495). There has also been some work in the area of cascade amplifiers for improving the transmission of radio frequency signals. For example, Yamamoto et al (U.S. Pat. No. 6,066,993) teaches such a use. All of these references are incorporated herein by this reference. A previous design for a receiving antenna that approaches some of the above-stated goals is Naito (U.S. Pat. No. 5,172,126), which is incorporated herein by this reference. It discloses use of what is effectively a non-resonant e-field probe and suggests an embodiment that could serve as a compact, high gain antenna. However, Naito's design precludes its use for datacasting or other consumer wideband applications since, among other things, it relies on two bipolar transistors in the receiving element. Both such transistors are limited by the reactive impedance of the parasitics, such that each antenna so fabricated would be limited in terms of the wavelength it could receive with any useful gain.

In contrast, in datacasting and certain other broadband applications, the signal of interest may be associated with any one of a wide range of broadcast wavelengths from VHF television to UHF Television or other frequencies used by FM Radio stations. Such signals are thus not of a type where the wave length may be known or ascertained before the fact. Consequently, the end user's receiving device must be manufactured with an antenna capable of effectively receiving a very broad range of wavelengths and be relatively insensitive to physical orientation while having a low manufacturing cost suitable of consumer grade electronics.

To address these heretofore unmet needs, among others, various embodiments of the present invention use a high transconductance transistor as the primary signal amplification element. One such readily available transistor having the required characteristics is commonly known as a "field effect transistor" or "FET." Field effect transistors have impedances that can be orders of magnitude higher than other transistors, enabling a far greater range of operation. The novel combination of a field effect transistor with a bipolar transistor in a cascode amplifier configuration, as found in some aspects and embodiments of the present invention, provides an antenna design that works in a commercially viable manner. Another preferred embodiment employs a nondissipative feedback loop in which a high efficiency transformer is used in conjunction with one or more high transconductance transistors. This novel architecture has the characteristics of having a high input resistance, low input capacitance, low noise and a very high second and third order Intercept Point. Such a design meets the unique needs for an antenna intended to be built into a datacasting receiver and also offers numerous advantages in other applications as well.

SUMMARY

Known television receiving antennas typically have a single feeder connected to either a single conductor element of approximately one-quarter wavelength, a dipole configuration with two elements that total one-half wavelength, or a single driven element within a group of parasitic elements (such as in the Yagi-Uda array). Using reactive components such as inductors, end capacitors, resonant traps and/or other components, antennas have been constructed with somewhat smaller dimensions than the basic one-quarter to one-half wavelength element. Loop antennas are also known and being highly directional, are useful in determining the source of the originating signal.

Antenna designs according to various embodiments of the present invention are unlike such known antennas in one or more of many respects. Antennas according to these embodiments can be considered an "active antenna" in some respects because they use active electronics to amplify a received signal. However, at least some of these embodiments differ technically from what is generally considered an "active antenna" because they do not rely on the usual resonant phenomenon that is associated with the power coupling mechanism of a traditional antenna. This also means that much smaller antenna sizes can be attained suitable for relatively lower frequencies where traditionally, antennas are often very large. For example, five foot long "rabbit ears" can be replaced with a five-inch printed circuit board. This enables a TV antenna to be concealed within a reasonably small consumer electronic device.

Antennas according to various aspects of the invention operate as an e-field probe to the extent they sense an electric field and then amplify it for the receiver. Traditional receiving antennas, on the other hand, rely on optimizing the impedance match in order to efficiently couple received power to the receiver. This requirement is what constrains the frequency bandwidth of effective operation for traditional antennas. Because antennas according to various aspects of the invention do not require an impedance match, they have an inherently large frequency bandwidth of operation. Antenna gain is scalable through the active electronics design. Higher performance electronic components are easily integrated into the design; therefore higher antenna gains can be achieved through small increments in cost.

Although antennas according to various embodiments of the invention can be used for reception of any sort of radiofrequency energy for any purposes, including mobile telephony, satellite communications, shortwave, and other purposes, embodiments of the subject invention may be readily optimized for receiving datacasting services where the data has been embedded in commercial television broadcasts. Since the broadcast frequency of the participating television station can be in either the VHF or UHF range, and because the receiving device needs to be relatively inexpensive, compact and able to operate without further adjustment after being positioned by the end user, this embodiment's broadband reception, low directional specificity, high gain, compactness and low cost of manufacture not only solve the previously unmet needs for this specific application but implies a wide range of commercial applications.

Objects of various embodiments of the invention satisfy some or all of the needs expressed or implied above or in other parts of this document. Such objects can include, for instance, to:

(a) receive Radio Frequency (RF) transmissions across a broad spectrum without requiring any manual adjustment or modification of the antenna;
(b) provide high gain, and thus reception of relatively weak signals;
(c) provide designs that can be manufactured in a compact and inexpensive form factor capable of being concealed in small consumer electronic devices;
(d) provide antennas that are relatively non-directional and insensitive to physical positioning relative to the transmitting antenna's direction.

Other objects, features and advantages of the invention and various embodiments of it will be apparent with reference to the remainder of this document.

BRIEF DESCRIPTION

DETAILED DESCRIPTION

A preferred embodiment of the invention will be described within the context of a compact, inexpensive datacasting receiver, without limitation of the many other purposes and uses of antennas according to various embodiments of the present invention. It will be apparent to one of ordinary skill in the art that antennas and embodiments of the invention are also applicable to many other radio frequency reception applications; the actual source or nature of the signals and their use by some associated device is immaterial to the invention. Other end uses, for example, could include wireless networks such as IEEE 802.11 (b) WiFi, cellular telephony, satellite receivers, commercial broadcast, and automobile or other mobile application antennas for the reception of a wide range of broadcasts such as GPS navigation information, traffic conditions information, MP-3 music players with content supplied by broadcasters. Other applications could include MDS, broadband cellular/satellite communications and Ham radio communications. Accordingly, embodiments according to the present invention are potentially useful for any device that receives radiofrequency energy, including defense electronics such as ESM receivers and communication receivers, industrial electronics such as satellite or terrestrial communications equipment, consumer electronics devices such as cellphones, pda's, WiFi and other wireless network cards/computers and other data devices, radios, television sets, pagers, security systems, and any other desired electronics product which uses the RF spectrum.

Figure 1A:
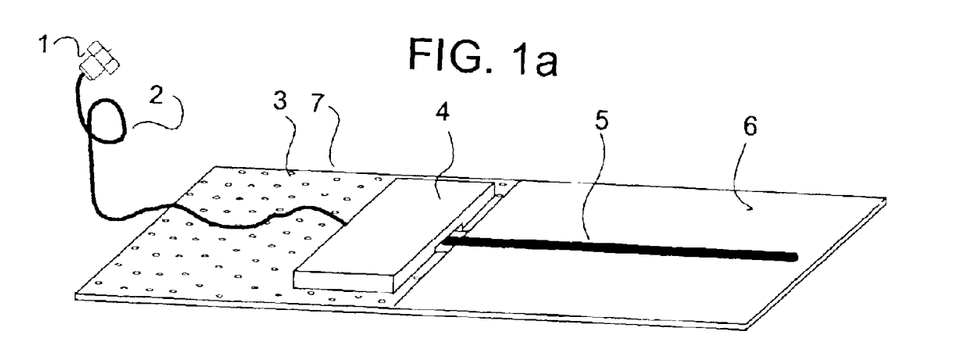
FIG. 1a shows a preferred embodiment of antennas according to the present invention in a form factor suitable for building into the case of a consumer datacasting receiver, television or other like device.

FIG. 1a shows one structure of an antenna according to a preferred embodiment of the invention as it could be manufactured to become a component in a consumer electronics set-top box. The electronics are mounted on a conductive circuit board 3 supported by an insulated substrate 6. Many other suitable physical structures could be employed. The antenna in this embodiment is coupled to the datacast receiver device using a connector 1 and antenna lead 2, although a connector is not required and any coupling technique or structure can be used. This particular active antenna design includes a conductive receiving element 5 in series with a voltage amplifying stage housed in a shielded case 4. The receiving element can be of an arbitrary shape as long as the material used is conductive enough to allow a voltage to accumulate across it as a result of an incident, time-varying electric field. A simple example of one possible receiving element geometry would be a straight copper wire. However, as would be apparent to one skilled in the art, elements with a wide range of physical configurations could be implemented. Examples of the broad classes of such configurations would include without limitation Wire Antennas, Aperture Antennas, Printed Antennas, Reflector Antennas, Conical Antennas, Notch Antennas and Directional Discontinuity Ring Radiator Antennas. Each of these classes of course has a number of members. By way of example only, the first-mentioned class of Wire Antennas includes such configurations as monopoles; straight, folded and trap dipoles, various shapes of loops, various shapes of helical, as well as Yagi-Uda, rhombic, fishbone, quad, beverage, wave and various fractal geometries. The ratio of the length or mass of the antenna receiving element 5 to the length, mass or surface area of the conductive surface 3 may be adjusted as needed so that the conductive surface may be used as a counterpoise 7.

Figure 1B:
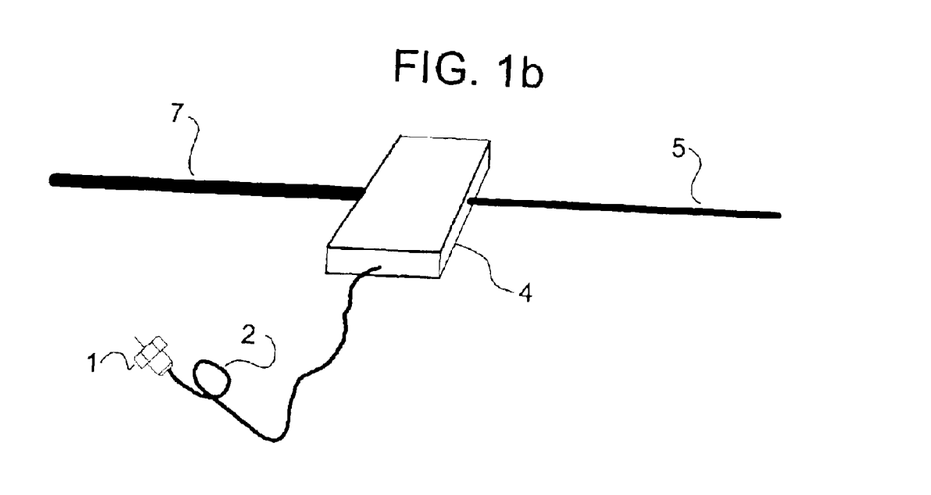
FIG. 1b shows another preferred embodiment of antennas according to the present invention in a form factor which includes a built-in counterpoise for improved gain but which is still suitable for concealing in the case or handle of a consumer datacasting receiver, television or other like device.

FIG. 1b shows another such structure of an antenna according to a preferred embodiment of the invention as it could be manufactured to become a component in a consumer electronics device. In this embodiment the counterpoise functionality of the conductive circuit board 3 found in FIG. 1a is replaced by a wire counterpoise 7 thus enabling the antenna to be concealed in a rotatable handle or other like device on a consumer electronics device.

Figure 2:
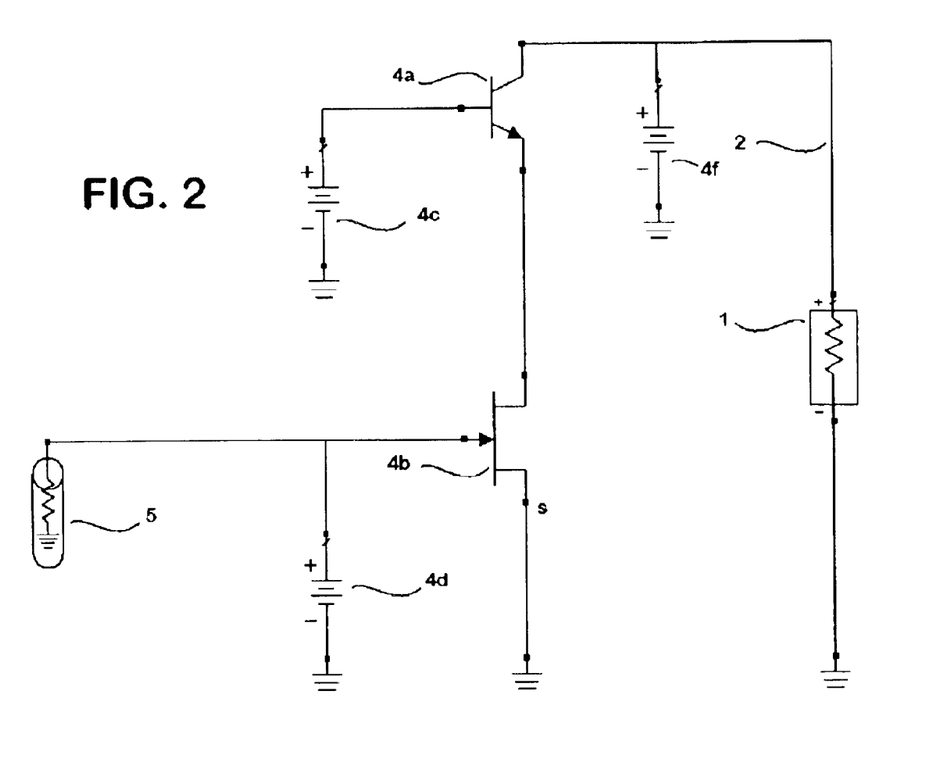
FIG. 2 is a schematic diagram of a circuit of one embodiment of antennas according to the present invention showing a Bipolar Junction Transistor and a Field Effect Transistor arranged in a Cascode configuration.

FIG. 2 is a schematic diagram for a circuit according to one embodiment of the invention. The voltage amplifying stage of this design consists of two low-noise transistors: a Field Effect Transistor (FET), 4b, and a Bipolar Junction Transistor (BJT), 4c. Any desired high transconductance transistor could be used in place of the FET. These transistors are arranged in what is conventionally referred to as a "Cascode" amplifier configuration when using transistors other than as in circuits according to embodiments of the present invention. The input of the stage of this circuit is the Gate input of the FET or other high transconductance transistor. The FET Source pin is connected to ground 3 and the Drain is connected to the Emitter pin of the BJT 4a. The Base of the BJT is biased appropriately at a DC voltage 4c but is RF grounded and the Collector pin is the effective output of the voltage amplifying stage.

Amplifying Stage Basic Circuit Configuration

The point of physical connection between the conductive receiving element and the voltage amplifying stage is at the base of the receiving element and the Gate input of the FET or other high transconductance transistor. Since the gate input of the FET inherently has very high impedance (on the order of megohms), only the open circuit voltage generated across the receiving element is sensed by the amplifying stage. The high transconductance FET translates the time-varying open circuit voltage into a time varying current through both the transistors. The function of the BJT is two-fold; it translates the time-varying current into a time varying voltage at the BJT collector output, effectively producing a voltage gain over the voltage at the input of the amplifying stage; and it effectively broadens the frequency response of the overall amplifying stage by maintaining a steady voltage potential over frequency between the gate of the FET and the drain/emitter junction between the two transistors.

This virtual RF ground reduces the effects of the Gate-Drain capacitance. In a normal FET amplifier, the Gate-Drain RF voltage is greater than the Gate-Source RF voltage, since the drain voltage is 180° out of phase with the Gate-Source voltage. This higher voltage increases the effective capacitance at the Gate terminal. The is often referred to as the "Miller Gain" or the "Miller Effect." Holding the Drain at virtual RF ground reduces the effects of the Gate-Drain capacitance to a minimum, resulting in a higher input impedance at the Gate that is the input to the amplifier.

Figure 3:
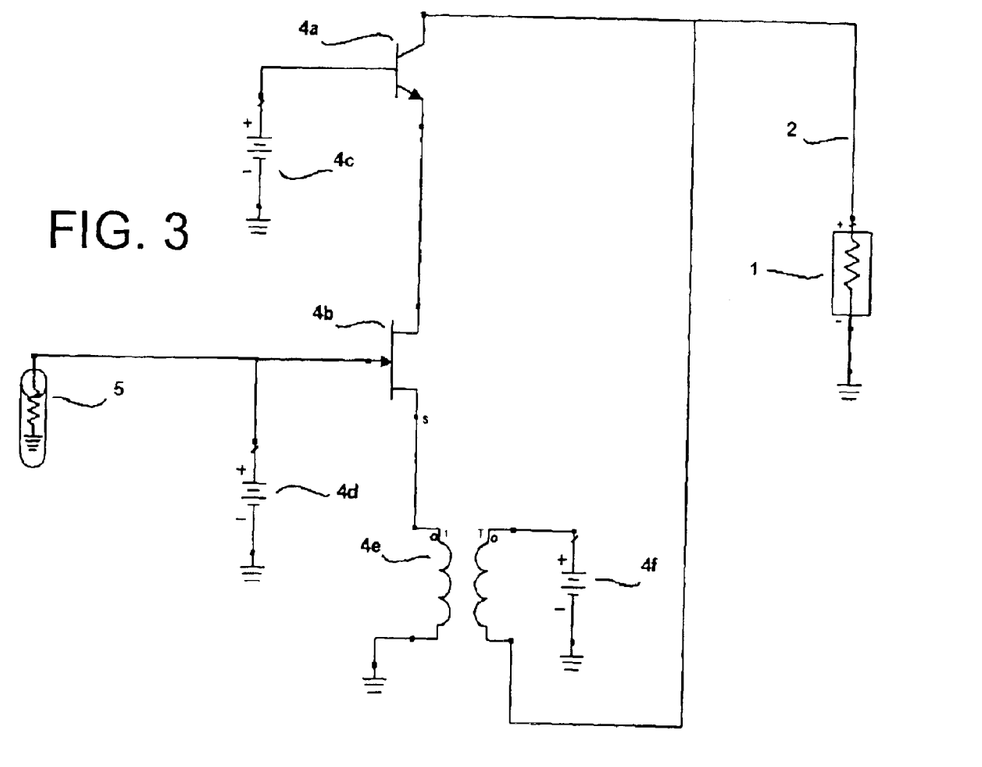
FIG. 3 is a schematic diagram of a circuit of another embodiment of antennas according to the present invention with a pair of transistors in a Cascode arrangement as in the previous example but with the addition of a high efficiency transformer arranged in a nondissipative feedback loop.

Passive Feedback Embodiment—Cascoded Amplifying Stage Circuit Configuration with Transformer FIG. 3 is a schematic diagram of another circuit according to an embodiment of the present invention, which also acts in a passive feedback manner but takes advantage of the previously mentioned Cascoded pair of transistors combined with the advantages of a passive feedback loop. The reduced Miller Effect of the Cascode configuration provides the associated bandwidth enhancements to the dynamic range of the feedback loop. As with FIG. 4, it utilizes 4e a T:1 transformer, where T is the turns ratio of the transformer. The primary winding is connected between the voltage source 4f and the collector of the BJT 4a and the secondary transformer winding is connected between the source pin of the FET, 4b, and ground, 3.

Figure 4:
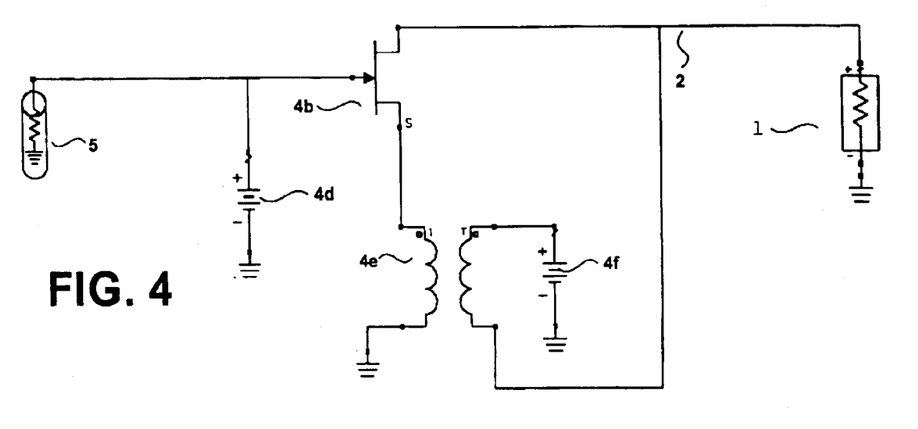
FIG. 4 is a schematic diagram of a circuit of another embodiment of antennas according to the present invention, which includes a high efficiency transformer arranged in a nondissipative feedback loop in conjunction with a single Field Effect Transistor instead of the Cascoded pair or transistors shown in the previous example.

Passive, Nondissipative Feedback Embodiment—Amplifying Stage Circuit Configuration with Single Transistor and Transformer in Single Stage, Dual Stage and Differential Arrangements FIG. 4 is a schematic diagram of another circuit according to a preferred embodiment of the present invention, which acts in a passive, nondissipative feedback manner. In this single stage embodiment, instead of a pair of transistors arranged in a Cascode configuration as is described above, the invention utilizes a single high transconductance transistor such as a FET 4b with a nondissipative feedback loop through 4e, a high efficiency T:1 transformer, where T is the turns ratio of the transformer. The primary transformer winding is connected between the source pin of the FET, 4b, and ground, 3. The secondary winding is connected between the voltage source 4f and the drain of the FET 4b. This couples the signal energy from the drain to the source pin. The added linearity imparted by the feedback loop allows a greater dynamic range of signal amplification.

By increasing the turns ratio of the high efficiency transformer on the secondary winding/FET Drain side, the amplifier's effective gain can be increased as desired. For example, a nondissipative feedback configuration using a high efficiency transformer with a 1:2 turns ratio will have 6-dB greater voltage gain and 6-dB greater power gain than the same circuit using a transformer with a 1:1 turns ratio. The transformer can be any configuration with any number of windings: bifilar, trifilar, quadrafilar, etc., as long as it is used in a nondissipative feedback configuration as part of the amplifier. This circuit has greater input impedance and is more linear in nature, resulting in a better Third Order Intercept point (TOI). Amplifier gain is controlled by T, the turns ratio of the transformer, and is very flat over frequency.

Figure 5:
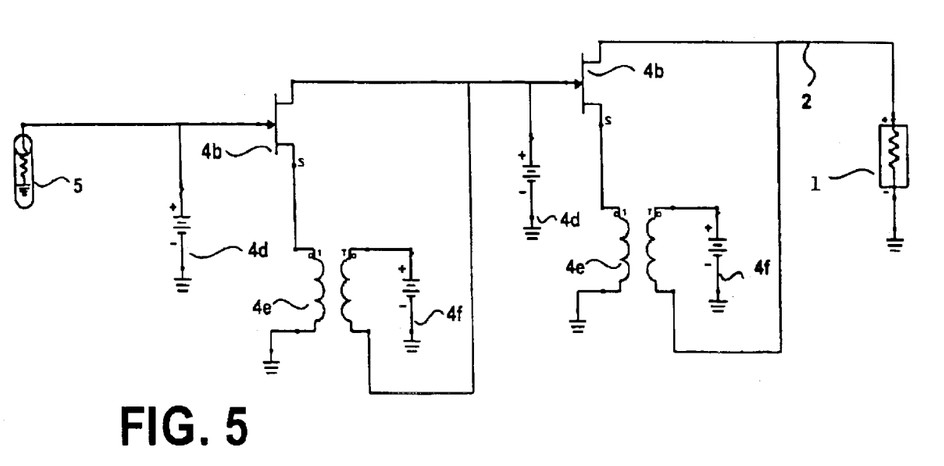
FIG. 5 is a schematic diagram of a circuit of another embodiment of antennas according to the present invention, which includes a dual stage nondissipative feedback arrangement consisting of two circuits as depicted in the previous figure cascaded together in series for higher power gain.

FIG. 5 Is a dual-stage nondissipative feedback embodiment that utilizes two of the single-stage nondissipative feedback configurations as described above and shown in FIG. 4, but cascaded in series for higher voltage and power gain. The output of the first stage (essentially identical to the circuit shown in FIG. 4) is connected to the input of the second stage which is a replica of the first stage.

Figure 6:
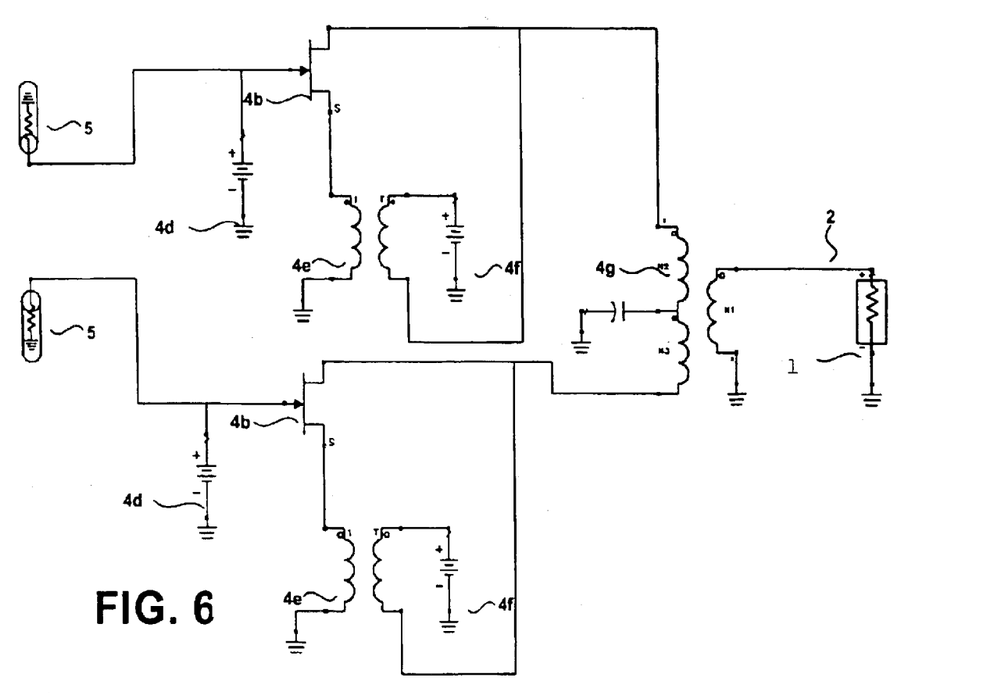
FIG. 6 is a schematic diagram of a circuit of another embodiment of antennas according to the present invention, which includes two single stage nondissipative feedback arrangements, each similar to FIG. 4, but in a differential arrangement for higher power gain.

FIG. 6 is a differential arrangement of two single stage nondissipative feedback circuits as first shown in FIG. 4. this embodiment provides twice the potential gain of the single amplifier approach and provides the opportunity for increasing gain further via the Balun transformer 4g located between the two drain pins of the FET 4b, and biased by voltage source 4f. As with the previous embodiment, gain is increased by T, the turns ratio of the transformer, and is very flat over frequency.

Figure 7:
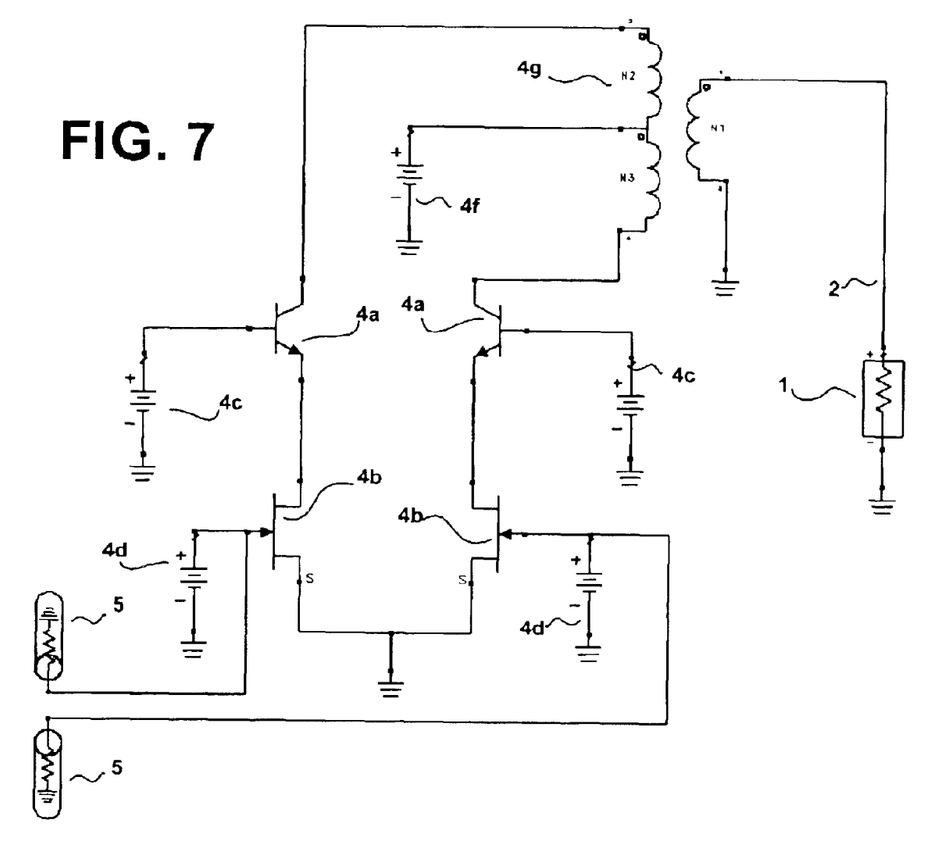
FIG. 7 is a schematic diagram of a circuit of another embodiment of antennas according to the present invention, which includes dual Cascode amplifiers in a differential arrangement.

Differential Dipole Embodiment—High Gain Amplification with Mirrored Cascode Amplifiers FIG. 7 is a schematic diagram of another circuit for an antenna according to an embodiment of the present invention, which acts in a differential dipole manner. Instead of the single FET and passive nondissipative feedback loop as shown in FIG. 6, it utilizes the Cascode amplifier approach shown in FIG. 2 but within a differential configuration. Each arm of the dipole element 5 is connected directly to its respective FET gate pin, 4b. The voltage differential between the two arms of the dipole element is amplified between the collector pins of the two BJTs, 4a.

As with the single transistor nondissipative feedback version depicted in FIG. 6, this embodiment provides twice the potential gain of the single amplifier approach and provides the opportunity for increasing gain further via the Balun transformer 4g located between the two bipolar 4a collector pins and biased by voltage source 4f.

Although various embodiments which incorporate the teachings of the present invention have been shown and described in detail herein, it will be readily understood by those skilled in the art that various changes in form and details may be made which incorporate these teachings without departing from the spirit and scope of the invention.

What is claimed is:

1. An active radio frequency reception circuit comprising:
    a. an antenna probe element adapted to sense an electric field coupled to one of the gate and base of a transistor,
    b. one of the source and emitter of said transistor coupled to ground by way of the primary winding of a transformer
    c. one of the drain and collector of said transistor coupled to the secondary winding of said transformer thereby creating a passive, nondissipative feedback loop that couples signal energy from said transistor's drain or collector to said transistors source or emitter while also coupling to a radio frequency receiver device.

2. A broad-band active radio frequency reception circuit comprising:
    a. an electric-field antenna probe element adapted to sense an electric field;
    b. the element coupled to the gate of a FET transistor;
    c. the source of the FET transistor coupled to ground; and
    d. the drain of the FET transistor coupled in a Cascode arrangement to another transistor that is coupled to a radio frequency receiver device, wherein the broad-band active radio frequency reception circuit is configured for broad-band reception of radio frequency signals.

3. A broad-band active radio frequency reception-circuit according to claim 1, wherein the circuit is connected to at least one other similar circuit such that the out-put of the active radio frequency reception circuit is coupled to one of the gate and base of a transistor in the at least one other similar circuit.

4. A circuit according to claim 1 further comprising an additional such circuit, the circuits coupled in a differential configuration through the windings of a Balun transformer.

5. A circuit according to claim 2 further comprising an additional such circuit, the circuits coupled in a differential configuration through the windings of a Balun transformer.

6. A circuit for coupling an element adapted to sense an electrical field to a receiver ever a predetermined broad bandwidth of radiofrequency energy, comprising:
    a. an electric field probe element adapted to sense an electrical field;
    b. a high transconductance FET, whose gate is coupled to the element;
    c. wherein the FET source is coupled to ground;
    d. wherein the FET drain is adapted to be coupled to a receiver via at least one device which is adapted to enhance signals presented by the circuit to the receiver; and
    e. wherein the element is configured so as to be not resonant to the broad bandwidth radiofrequency energy.

7. A circuit according to claim 6 in which said device adapted to enhance signals includes a bipolar junction transistor whose emitter is coupled to the FET drain in a cascade amplifier relationship and whose collector is adapted to be coupled to the receiver.

8. A circuit according to claim 6 in which said device adapted to enhance signals includes a feedback loop between the drain and the source of the FET, which feedback loop includes a transformer having a first side coupled to the FET drain and a voltage source, and a second side coupled to ground and the FET source.

9. A circuit for coupling an element adapted to sense an electrical field to a receiver over a predetermined bandwidth of radiofrequency energy, comprising:
    a. an element adapted to sense an electrical field;
    b. a high transconductance FET, whose gate is coupled to the element;
    c. wherein the FET source is coupled to ground;
    d. wherein the FET drain is adapted to be coupled to a to a receiver via;
        (i) a bipolar junction transistor whose emitter is coupled to the FET drain in a cascade amplifier relationship and whose collector is adapted to be coupled to the receiver; and
        (ii) a feedback loop between the collector of the bipolar junction transistor and the source of the FET, which feedback loop includes a transformer having a first side coupled to the collector of the bipolar junction transistor and a voltage source, and a second side coupled to ground and the FET source; and
    e. wherein the element is not resonant to the predetermined bandwidth of radiofrequency energy.

10. A circuit for coupling an element adapted to sense an electrical field to a receiver over a broad-band radiofrequency energy, comprising:
  a. a first and a second element adapted to sense an electrical field;
  b. for the first element;
    (i) a first high transconductance FET whose base is coupled to the first element and whose source is coupled to ground; and
    (ii) a first bipolar junction transistor whose emitter is coupled to the drain of the first FET and whose collector is coupled to a transformer;
  c. for the second element:
    (i) a second high transconductance FET whose base is coupled to the second element and whose source is coupled to ground; and
    (ii) a second bipolar junction transistor whose emitter is coupled to the drain of the second FET and whose collector is coupled to the transformer;
  d. the transformer including:
    (i) a first side coupled to the collectors of each of the two bipolar junction transistors and tapped between the couplings to said collectors to a voltage source; and
    (ii) a second side adapted to be coupled to a receiver;
  e. wherein the first and second elements are not resonant to the broad-band radiofrequency energy.

11. A circuit according to claim 1 further comprising a television receiver.

12. A circuit according to claim 2 further comprising a television receiver.

13. A circuit according to claim 6 further comprising a television receiver.

14. A circuit according to claim 9 further comprising a television receiver.

15. A circuit according to claim 10 further comprising a television receiver.

16. A circuit according to claim 1 further comprising a consumer electronics device.

17. A circuit according to claim 2 further comprising a consumer electronics device.

18. A circuit according to claim 6 further comprising a consumer electronics device.

19. A circuit according to claim 9 further comprising a consumer electronics device.

20. A circuit according to claim 10 further comprising a consumer electronics device.

21. A circuit according to claim 1 wherein the element is part of a printed circuit.

22. A circuit according to claim 2 wherein the element is part of a printed circuit.

23. A circuit according to claim 6 wherein the element is part of a printed circuit.

24. A circuit according to claim 9 wherein the element is part of a printed circuit.

25. A circuit according to claim 10 wherein the elements are part of a printed circuit.

26. A circuit for coupling an element adapted to sense an electrical field to a receiver over a predetermined broad bandwidth of radiofrequency energy, comprising:
  an electric field probe element adapted to sense an electrical field;
  a first high transconductance FET transistor, whose gate is coupled to the element and its source is coupled to ground;
  wherein the FET drain is adapted to be coupled to a receiver via at least a second transistor which is adapted to enhance signals presented by the circuit to the receiver;
  wherein the element is configured so as to be not resonant to the broad bandwidth radiofrequency energy; and
  at least one inductive feedback path configured to couple either one or both transistors' drain/collector to their corresponding source/emitter.

27. A circuit according to claim 26, wherein the second transistor is a FET or a bipolar transistor.

28. A circuit according to claim 26 further comprising a television receiver.

29. A circuit according to claim 26 further comprising a consumer electronics device.

30. A circuit according to claim 26 wherein the element is part of a printed circuit.

* * * * *

UNITED STATES PATENT AND TRADEMARK OFFICE
CERTIFICATE OF CORRECTION

PATENT NO. : 6,917,336 B2
DATED : July 12, 2005
INVENTOR(S) : Andrew Rowser et al.

It is certified that error appears in the above-identified patent and that said Letters Patent is hereby corrected as shown below:

Column 2,
Line 2, ""cascade"" should be -- cascode --;
Line 2, "Cascade" should be -- Cascode --;
Line 5, "cascade" should be -- cascode --.

Signed and Sealed this

Fifteenth Day of November, 2005

JON W. DUDAS
*Director of the United States Patent and Trademark Office*